United States Patent
Agarwal et al.

(10) Patent No.: US 9,565,514 B2
(45) Date of Patent: Feb. 7, 2017

(54) SYSTEMS AND METHODS FOR DISABLING PAGE SCANS

(71) Applicant: QUALCOMM Incorporated, San Diego, CA (US)

(72) Inventors: Shivendra Agarwal, Hyderabad (IN); Saurabh Patel, Hyderabad (IN); Sundaresan Ramachandran, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/738,741

(22) Filed: Jun. 12, 2015

(65) Prior Publication Data

US 2016/0366538 A1    Dec. 15, 2016

(51) Int. Cl.
*H04W 4/00* (2009.01)
*H04W 76/02* (2009.01)
*H04W 84/18* (2009.01)

(52) U.S. Cl.
CPC ............ *H04W 4/008* (2013.01); *H04W 76/02* (2013.01); *H04W 84/18* (2013.01)

(58) Field of Classification Search
CPC ............................... H04W 76/02; Y02B 60/50
See application file for complete search history.

(56) References Cited

U.S. PATENT DOCUMENTS

| | | | |
|---|---|---|---|
| 2004/0092249 A1* | 5/2004 | Sugikawa | H04L 61/301 455/411 |
| 2006/0034231 A1* | 2/2006 | Tailor | H04W 88/02 370/338 |
| 2006/0128308 A1* | 6/2006 | Michael | H04W 24/00 455/41.2 |
| 2008/0242365 A1 | 10/2008 | Rokusek et al. | |
| 2009/0061770 A1 | 3/2009 | Agardh | |
| 2009/0271267 A1* | 10/2009 | Moukas | G06Q 10/0631 705/14.48 |
| 2011/0171937 A1 | 7/2011 | Hill et al. | |
| 2013/0157574 A1* | 6/2013 | Craine | H04M 1/72577 455/41.2 |
| 2014/0094123 A1 | 4/2014 | Polo et al. | |
| 2014/0206286 A1 | 7/2014 | Palin et al. | |

\* cited by examiner

*Primary Examiner* — David Bilodeau
(74) *Attorney, Agent, or Firm* — Austin Rapp & Hardman (57) ABSTRACT

A method for wireless communication by a Bluetooth device is described. The method includes determining a paired device configuration for Bluetooth communication. The method also includes disabling Bluetooth page scans based on the paired device configuration. The page scans may be disabled when the Bluetooth device is in a connectable state for Bluetooth communication.

26 Claims, 8 Drawing Sheets

SYSTEMS AND METHODS FOR DISABLING PAGE SCANS

TECHNICAL FIELD

The present disclosure relates generally to wireless communications. More specifically, the present disclosure relates to systems and methods for disabling page scans in Bluetooth communication.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Many electronic devices may make use of different communication technologies. For example, electronic devices may communicate using Bluetooth technology. A Bluetooth device may communicate with one or more remote Bluetooth devices. The Bluetooth device may use pairing to establish a connection with a remote Bluetooth device. The Bluetooth device may store a profile for a paired device to facilitate subsequent connections.

The Bluetooth device may perform page scans to connect to a paired Bluetooth device. The page scans may be performed in a periodic manner, which may result in significant power consumption. The Bluetooth device may reduce battery power consumption by disabling page scans based on paired device configurations.

SUMMARY

A method for wireless communication by a Bluetooth device is described. The method includes determining a paired device configuration for Bluetooth communication. The method also includes disabling Bluetooth page scans based on the paired device configuration when the Bluetooth device is in a connectable state for Bluetooth communication.

Bluetooth page scans may be disabled when Bluetooth communication is on and the Bluetooth device has no paired devices. Bluetooth page scans may be disabled when a paired device list does not contain any paired device profiles. Bluetooth page scans may be disabled when all paired device profiles have been removed from the Bluetooth device.

Bluetooth page scans may be disabled when the paired device configuration is Bluetooth communication is on and no paired device has attempted to connect to the Bluetooth device within a threshold time period.

Determining the paired device configuration may include determining a paired device connection history. Bluetooth page scans may be disabled at a specific time of day based on the paired device connection history for that time of day.

Bluetooth page scans may be disabled when the paired device configuration is all paired devices are connected to the Bluetooth device. The method may also include applying resources made available by disabling the page scans to improve the quality of service of existing connections to the paired devices.

A Bluetooth device is also described. The Bluetooth device includes a processor, memory in electronic communication with the processor, and instructions stored in the memory. The instructions are executable by the processor to determine a paired device configuration for Bluetooth communication. The instructions are also executable by the processor to disable Bluetooth page scans based on the paired device configuration when the Bluetooth device is in a connectable state for Bluetooth communication.

An apparatus for wireless communication is also described. The apparatus includes means for determining a paired device configuration for Bluetooth communication. The apparatus also includes means for disabling Bluetooth page scans based on the paired device configuration when the apparatus is in a connectable state for Bluetooth communication.

A computer-program product for wireless communication is also described. The computer-program product includes a non-transitory computer-readable medium having instructions thereon. The instructions include code for causing a Bluetooth device to determine a paired device configuration for Bluetooth communication. The instructions also include code for causing the Bluetooth device to disable Bluetooth page scans based on the paired device configuration when the Bluetooth device is in a connectable state for Bluetooth communication.

DETAILED DESCRIPTION

The detailed description set forth below in connection with the appended drawings is intended as a description of exemplary implementations of the disclosure and is not intended to represent the only implementations in which the disclosure may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the disclosure. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
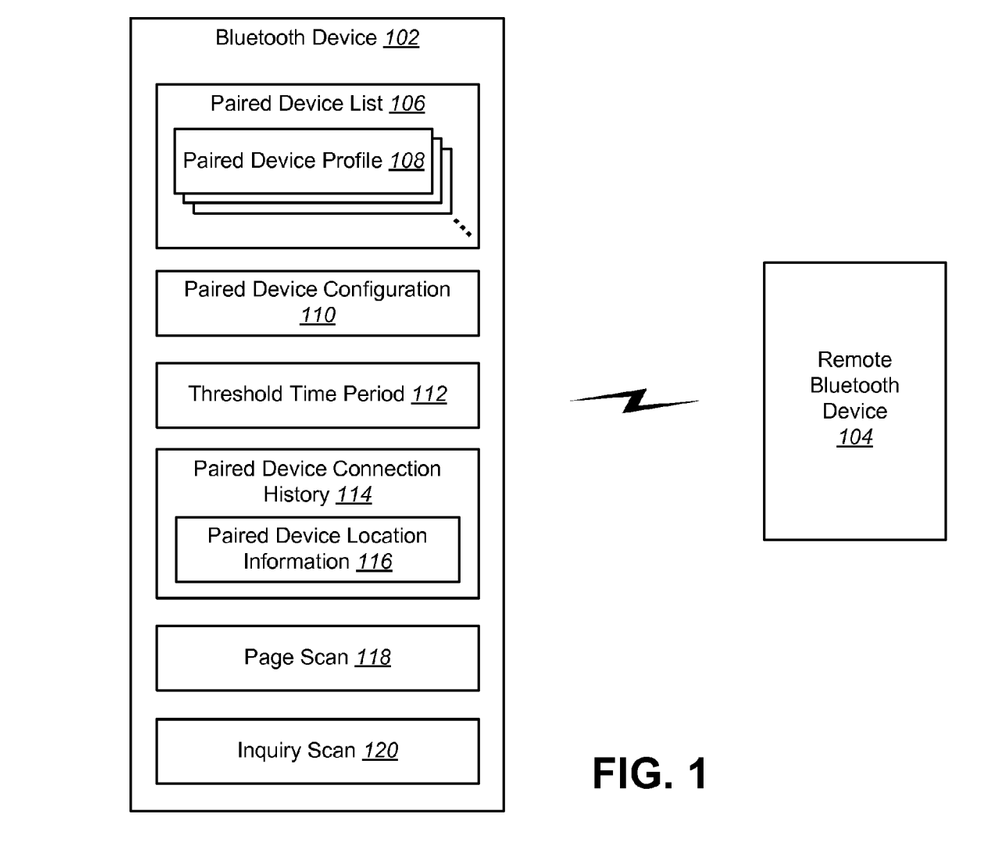
FIG. 1 is a block diagram illustrating one configuration of a Bluetooth device and a remote Bluetooth device in which systems and methods for disabling page scans may be implemented.

FIG. 1 is a block diagram illustrating one configuration of a Bluetooth device 102 and a remote Bluetooth device 104 in which systems and methods for disabling page scans 118 may be implemented. Wireless communication systems are widely deployed to provide various types of communication content such as voice, data, and so on.

Some mobile devices may utilize multiple communication technologies. For example, one communication technology may be utilized for mobile wireless system (MWS) (e.g., cellular) communications, while another communication technology may be utilized for wireless connectivity (WCN) communications. MWS may refer to larger wireless networks (e.g., wireless wide area networks (WWANs), cellular phone networks, Long Term Evolution (LTE) networks, Global System for Mobile Communications (GSM) networks, code division multiple access (CDMA) networks, CDMA2000 networks, wideband CDMA (W-CDMA) networks, Universal mobile Telecommunications System (UMTS) networks, Worldwide Interoperability for Microwave Access (WiMAX) networks, etc.). WCN may refer to relatively smaller wireless networks (e.g., wireless local area networks (WLANs), wireless personal area networks (WPANs), IEEE 802.11 (Wi-Fi) networks, Bluetooth (BT) networks, wireless Universal Serial Bus (USB) networks, etc.).

In one configuration, the Bluetooth device 102 may include a cellular transceiver that may communicate with a cellular network. The cellular network may be a MWS, as described above. The cellular network may be a multiple-access system capable of supporting communication with multiple mobile devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, evolution-data optimized (EV-DO), single-carrier frequency division multiple access (SC-FDMA) systems, $3^{rd}$ Generation Partnership Project (3GPP) Long Term Evolution (LTE) systems, and spatial division multiple access (SDMA) systems.

The terms "networks" and "systems" are often used interchangeably. A CDMA network may implement a radio technology such as Universal Terrestrial Radio Access (UTRA), CDMA2000, etc. UTRA includes W-CDMA and Low Chip Rate (LCR) while CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices.

A Bluetooth device 102 may also be referred to as a wireless device, wireless communication device, a mobile device, mobile station, subscriber station, client, client station, user equipment (UE), remote station, access terminal, mobile terminal, terminal, user terminal, subscriber unit, etc. Examples of Bluetooth devices 102 include laptop or desktop computers, cellular phones, smart phones, wireless modems, e-readers, tablet devices, gaming systems, etc. Some of these devices may operate in accordance with one or more industry standards.

Communications in a mobile wireless system (e.g., a multiple-access system) may be achieved through transmissions over a wireless link. Such a wireless link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The Bluetooth device 102 may include a Bluetooth transceiver that establishes links with one or more remote Bluetooth devices 104. Bluetooth is a packet-based protocol with a master-slave structure. Bluetooth operates in the Industrial, Scientific and Medical (ISM) 2.4 GHz short-range radio frequency band (e.g., 2400-2483.5 MHz). Bluetooth uses a radio technology called frequency-hopping spread spectrum in which transmitted data is divided into packets and each packet is transmitted on a designated Bluetooth frequency (e.g., channel). The Bluetooth device 102 may include an antenna configured to transmit and receive Bluetooth signals.

Communications in a Bluetooth network may be achieved based on a master polled system. The master polled system may utilize time-division duplexing (TDD) in which a Bluetooth device 102 may send a packet to a remote Bluetooth device 104. In a master polled system, the master device sending the packet gives the slave wireless device the ability to transmit back.

In Bluetooth, one master device may communicate with one or more slave devices. The master device may also be referred to simply as "master" and the slave device may also be referred to as "slave." The network of master device and slave devices may be referred to as a piconet. The Bluetooth devices 102, 104 may switch roles (e.g., master and slave) by agreement. In one implementation, the Bluetooth device 102 may be the master device and one or more remote Bluetooth devices 104 may be slave devices. In another implementation, the Bluetooth device 102 may be the slave device.

The Bluetooth device 102 may establish a channel with one or more remote Bluetooth devices 104. For example, the Bluetooth device 102 may establish a first channel with a first remote Bluetooth device 104. The Bluetooth device 102 may establish a second channel with a second remote Bluetooth device 104, and so forth. The Bluetooth device 102 may establish the channels with the remote Bluetooth devices 104 using a single Bluetooth transceiver. As used herein, the term "channel" may also be referred to as a Bluetooth link.

The Bluetooth device 102 may discover and connect to one or more remote Bluetooth devices 104. The Bluetooth device 102 may discover which other remote Bluetooth devices 104 are within range using an inquiry procedure. For the inquiry procedure, an unconnected slave device that wants to be discovered by a master device may periodically enter an inquiry scan 120 state where the slave device listens for inquiries. The master device may transmit inquiries on multiple channels and listen for a slave's response. The master device can then connect to a slave device by paging it.

An unconnected Bluetooth device 102 may periodically perform a page scan 118 to connect to one or more remote Bluetooth devices 104. To perform a page scan 118, the Bluetooth device 102 may activate its Bluetooth receiver and listen for a master device (e.g., a remote Bluetooth device 104 acting as master) that might be trying to page it. If the Bluetooth device 102 receives a page, the Bluetooth device 102 may respond to the page and pair with the remote Bluetooth device 104.

To enhance security, the Bluetooth device 102 and remote Bluetooth device 104 may use pairing to establish a connection. In one configuration, the Bluetooth device 102 may establish a relationship with a remote Bluetooth device 104 by sharing a link key. In an implementation, the link key may be a paired device profile 108. If both the Bluetooth device 102 and the remote Bluetooth device 104 store the same link key, they are said to be paired devices. The paired devices may cryptographically authenticate the identity of the other device, ensuring it is the same device it previously paired with. Once a link key is generated, the Bluetooth device 102 and remote Bluetooth device 104 may encrypt exchanged data.

The Bluetooth device 102 may include a paired device list 106. The paired device list 106 may include one or multiple paired device profiles 108 related to paired devices. Additionally, the paired device list 106 may be empty if there are no stored paired device profiles 108. For example, the paired device list 106 may include the link key for one or more paired devices. If the paired device list 106 includes one or more paired device profiles 108 associated with one or more remote Bluetooth devices 104, the Bluetooth device 102 is paired with the one or more remote Bluetooth devices 104.

When a paired device profile 108 for a remote Bluetooth device 104 is removed from the paired device list 106, the Bluetooth device 102 is no longer paired with the remote Bluetooth device 104. If there are no paired device profiles 108 in the paired device list 106, then the Bluetooth device 102 is not paired with any remote Bluetooth device 104.

Users can remove one or more paired devices from the Bluetooth device 102. If a user deletes a paired device profile 108 from the Bluetooth device 102, this removes the pairing with the associated remote Bluetooth device 104. However, the remote Bluetooth device 104 may still be paired with the Bluetooth device 102. In other words, the remote Bluetooth device 104 may still have the paired device profile 108 associated with the Bluetooth device 102. Therefore, it is possible for one device 102, 104 to have a stored paired device profile 108 for a device it is no longer paired with.

It should be noted that Bluetooth is a different technology than Bluetooth low energy (BLE). Bluetooth and BLE follow different protocols and perform different types of scans to discover and connect to remote devices. For example, a BLE device may perform a BLE scan to find a device. A BLE scan may discover an advertising packet. Connections in BLE are based on an anchor point mechanism that differs from Bluetooth. BLE only has the advertising scan (e.g., BLE scan). Therefore, the BLE scan is used to discover a BLE device. After the scanning is done, there is a specific period of time when a BLE device can communicate with another BLE device. This is referred to as a BLE anchor point. This process by a BLE device performing a BLE scan is called a discovery and advertisement process.

The Bluetooth page scan 118, on the other hand, helps the Bluetooth device 102 to connect to a remote Bluetooth device 104. The Bluetooth page scan 118 is not used to discover a remote Bluetooth device 104. In Bluetooth, discovery is accomplished by the inquiry scan 120. In BLE, the connection is performed on the BLE anchor point. As such, a BLE scan differs from a Bluetooth page scan 118 in that the BLE scan discovers other BLE devices, but the Bluetooth page scan 118 helps connect a Bluetooth device 102. Therefore, as used herein, the Bluetooth device 802 may perform page scans 118 according to Bluetooth protocols, rather than BLE protocols. Furthermore, as used herein, "Bluetooth communication" refers to communication according to Bluetooth standards and protocols, not BLE standards.

According to Bluetooth standards, a Bluetooth device 102 has a property of being in an always connectable state when Bluetooth communication is on. If a remote Bluetooth device 104 has already paired to the Bluetooth device 102, then when the remote Bluetooth device 104 wants to connect back to the Bluetooth device 102, the Bluetooth device 102 should always be available. In other words, when Bluetooth communication is activated on the Bluetooth device 102, the Bluetooth device 102 may always be in a connectable state.

When Bluetooth is activated, if the Bluetooth device 102 has earlier paired with some other remote Bluetooth device 104, the user of the Bluetooth device 102 does not have to do anything to reestablish a connection with the remote Bluetooth device 104. In this case, the remote Bluetooth device 104 can automatically connect to the Bluetooth device 102 even without user consent or permission. For example, if the Bluetooth device 102 has earlier paired with a Bluetooth headset, if the Bluetooth device 102 is on, the Bluetooth headset can directly connect to the Bluetooth device 102 without asking the user for permission. The user can just click a button on your Bluetooth headset and it will directly connect to the Bluetooth device 102. If the Bluetooth device 102 includes a paired device profile 108 (e.g., link key) for the Bluetooth headset from an earlier pairing, then there is no need for the Bluetooth headset to perform a pairing procedure to connect back to the Bluetooth device 102.

A Bluetooth device 102 may be always connectable by performing periodic page scans 118. In one configuration, the Bluetooth device 102 may perform a page scan 118 every 1.28 seconds. This may result in significant power consumption. Furthermore, it is very common that a user may not turn off Bluetooth after its use, which may result in continuous power consumption for the page scan 118.

However, there are scenarios where page scans 118 may be unnecessary, even when Bluetooth is on and the Bluetooth device 102 is in a connectable state. The Bluetooth device 102 may determine whether to disable Bluetooth page scans 118 based on a paired device configuration 110. The Bluetooth device 102 may determine the configuration (e.g., state) of paired devices and disable page scans 118 based on the paired device configuration 110. The Bluetooth page scan 118 may be optimized by making it configurable rather than always connectable. In other words, the page scan 118 may be conditionally enabled and disabled based on various use cases. This may reduce battery power consumption and provide resources to improve the quality of service (QoS) for existing connections.

Various paired device configurations 110 may be used as conditions to disable page scans 118. In a first case, the paired device configuration 110 may be that Bluetooth communication is on and there are no paired devices. In this case, the paired device list 106 may not contain any paired device profiles 108. This may be because no remote Bluetooth device 104 has paired with the Bluetooth device 102.

Alternatively, there may be no paired devices when all paired device profiles 108 have been removed from the Bluetooth device 102. For example, a user may delete all paired device profiles 108 from the paired device list 106. If a user does not want to connect to a remote Bluetooth device 104, the user may delete the paired device profile 108 associated with the remote Bluetooth device 104. By deleting the paired device profile 108, the Bluetooth device 102 will no longer be paired to the remote Bluetooth device 104. When there are no paired devices or the user removed paired devices, this may indicate that the user is not interested in any incoming connection. In this case, page scans 118 can be avoided and the Bluetooth device 102 may disable the page scans 118.

In a second case, the paired device configuration 110 may be that Bluetooth communication is on and no paired device has attempted to connect to the Bluetooth device 102 within a threshold time period 112. The threshold time period 112 may be an amount of time the Bluetooth device 102 has not detected connection activity from one or more remote Bluetooth devices 104. The threshold time period 112 may be a configurable amount of time (e.g., hours, days). The threshold time period 112 may be selected to indicate a low likelihood of connection by the paired devices. In other words, if a paired device has not attempted to connect with the Bluetooth device 102 within the threshold time period 112, then there is a low likelihood that the paired device will connect to the Bluetooth device 102 in the future.

In one example, the Bluetooth device 102 may pair and connect to a remote Bluetooth device 104 in one location, but the Bluetooth device 102 may move to a different location. For example, a user on a flight may use the Bluetooth device 102 to connect to a remote Bluetooth device 104 of another passenger to exchange files. Upon disembarking from the flight, the user may not want to connect to the previous remote Bluetooth device 104 anymore. However, that remote Bluetooth device 104 is still paired in the paired device list 106. According to this second case, after determining that no paired device has attempted to connect to the Bluetooth device 102 within the threshold time period 112, the Bluetooth device 102 may then disable page scans 118.

In a third case, the paired device configuration 110 may be based on a paired device connection history 114. In this case, the Bluetooth device 102 may disable Bluetooth page scans 118 at a specific time of day based on the paired device connection history 114 for that time of day. For example, a user may use a set of remote Bluetooth devices 104 on a daily basis and normally the user follows some time pattern. The Bluetooth device 102 may store the paired device use patterns in the paired device connection history 114.

In one example, while going to or coming from the office, a user may connect the Bluetooth device 102 to a Bluetooth carkit or a Bluetooth headset (e.g., a Synchronous Connection Oriented (SCO) link or Advanced Audio Distribution Profile (A2DP) headset). However, there might not be any Bluetooth activity during the afternoon or during the night. During the night, the user may not use Bluetooth. If Bluetooth is turned on at night, there may be a lot of power wasted. The Bluetooth device 102 can determine the user time pattern and optimize the Bluetooth page scan 118 when the probability of Bluetooth connection is low.

In another implementation of the paired device connection history 114, the Bluetooth device 102 may also store the paired device location information 116. The paired device location information 116 may be determined from GPS, WWAN, WLAN signals or other location information. The Bluetooth device 102 may disable page scans 118 based on the paired device location information 116. For example, the Bluetooth device 102 may determine that connections to paired devices only occur at specific locations. The Bluetooth device 102 may disable page scans 118 when the Bluetooth device 102 is not in locations indicated by the paired device location information 116.

In a fourth case, the paired device configuration 110 may be that all paired devices are connected to the Bluetooth device 102. When all paired devices are connected to the Bluetooth device 102, the user of the Bluetooth device 102 normally does not expect any incoming connection. In this case, when Bluetooth is on and all paired devices are connected, the Bluetooth page scan 118 may be unnecessary. As discussed above, the objective of the page scan 118 is to connect to a paired device. If all paired devices are connected, the Bluetooth device 102 is not expecting any new connection. The Bluetooth device 102 may check at the firmware level that it has already connected to every paired device in the paired device list 106. If the Bluetooth device 102 is connected to all paired devices, then the Bluetooth device 102 may disable the page scan 118.

If a new remote Bluetooth device 104 wants to connect to the Bluetooth device 102, then the Bluetooth device 102 may perform an inquiry scan 120. It should be noted that when the Bluetooth device 102 does the inquiry scan 120, the inquiry scan 120 process takes place on a separate path than the page scan 118. As such, according to the described systems and methods, the page scan 118 is independent of the inquiry scan 120. In other words, disabling the page scan 118 does not have dependency on the inquiry scans 120. For example, if the user chooses to have the Bluetooth device 102 be invisible to other non-paired remote Bluetooth devices 104, the inquiry scan 120 may be disabled on the Bluetooth device 102. However, the Bluetooth device 102 may determine whether to disable the page scan 118 independent of the status of the inquiry scan 120.

Disabling page scans 118 based on the paired device configuration 110 where all paired devices are connected may provide better processor performance. This may be especially beneficial when the Bluetooth processor is shared with WLAN, FM and other connectivity sub systems. Also, because the Bluetooth device 102 can optimize the page scan 118, the Bluetooth device 102 can focus on the quality of service (QoS) of the existing connection/s. The Bluetooth device 102 may apply resources made available by disabling the page scans 118 to improve the QoS of existing connections to the paired devices.

In one example, a Bluetooth scheduler may be implemented in the Bluetooth firmware to schedule Bluetooth activity. This Bluetooth activity may include a voice call, page scan 118 and other activities. If the Bluetooth scheduler only has one task, which is focusing on the voice call quality, and does not have to periodically schedule the page scan 118, then the processing power and clock frequency may be reduced. The Bluetooth scheduler may direct these resources toward improving the voice call quality.

It should be noted that the paired device configurations 110 described above may be used independently or in combination with each other to determine whether to disable the page scan 118. For example, the paired device configuration 110 of the first case (e.g., no paired devices) may be the only condition evaluated to determine whether to disable the page scan 118. Alternatively, the paired device configuration 110 of the first case may be used in combination with one or more other cases to determine whether to disable the page scan 118.

By controlling incoming Bluetooth connections by enabling and disabling page scans 118, the Bluetooth device 102 may achieve power savings. The Bluetooth device 102 may completely shut down Bluetooth communication if there are no paired devices, as described in the first case above. Furthermore, the Bluetooth device 102 may reduce page scan 118 frequency, when the probability of a Bluetooth connection is low, as described in connection with the second and third cases.

The described systems and methods may also help in Bluetooth co-existence (BTC) certification test cases. During the BTC certification test cases, the simultaneous performance of WLAN (e.g., WiFi) and Bluetooth may be evaluated. In most of the BTC test cases, a tester device may connect to only desired Bluetooth devices 102. As observed in the fourth case described above, if all paired devices are connected, then the page scan 118 is disabled. In this case the effective WLAN throughput increases because the additional resources from the disabled page scan 118 may be directed to WLAN operations. This will improve the co-existence performance of the Bluetooth device 102.

Another benefit of the described systems and methods includes improvement in the Bluetooth QoS. Bluetooth scheduling may become very complicated when multiple devices are connected to the Bluetooth device 102. As described in connection with the fourth case, the Bluetooth device 102 may achieve some concessions by disabling the page scan 118 when all paired devices are connected. With fewer payloads devoted to the page scan 118, the Bluetooth device 102 can then focus these resources on the QoS of the existing connection(s).

Figure 2:
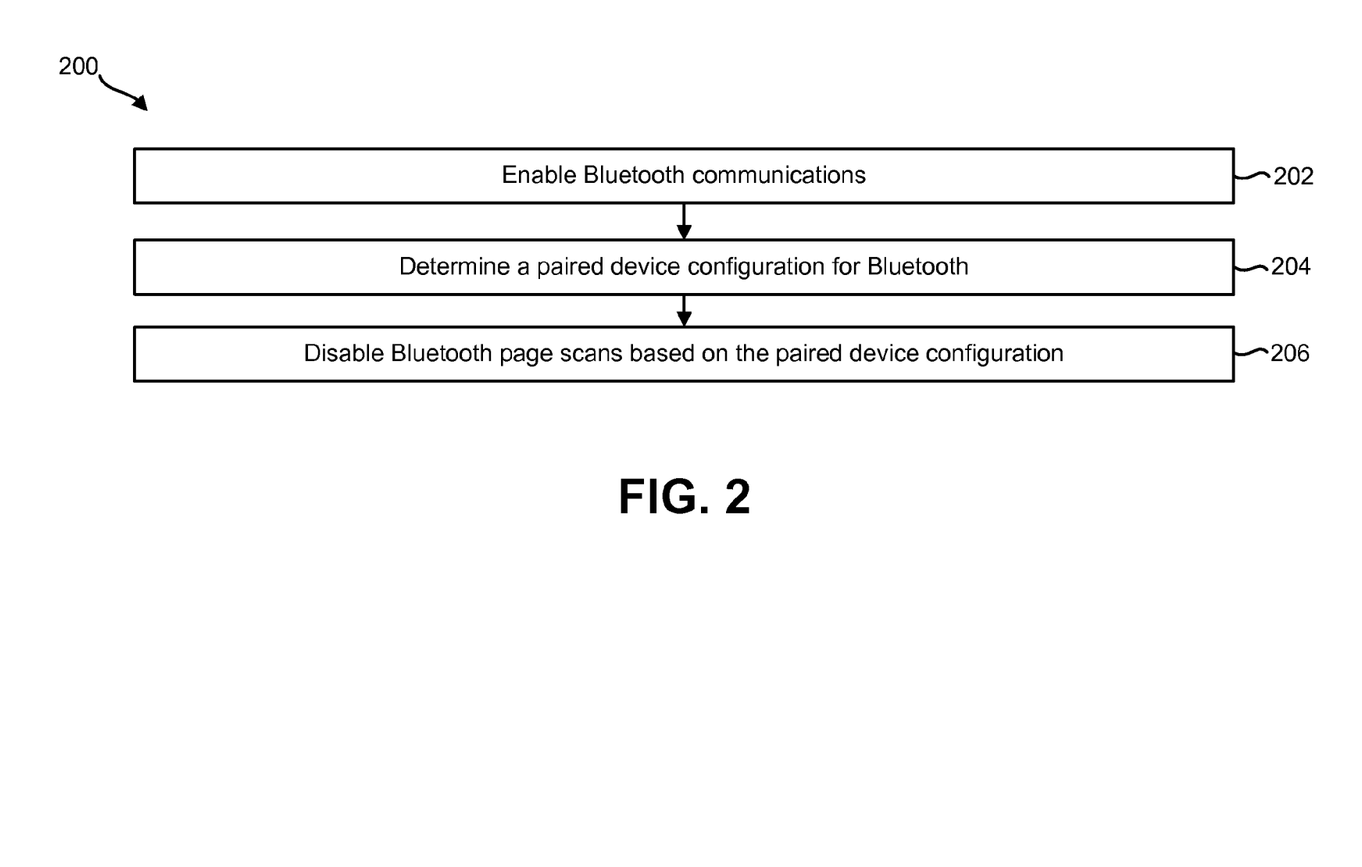
FIG. 2 is a flow diagram illustrating a method for disabling a Bluetooth page scan.

FIG. 2 is a flow diagram illustrating a method 200 for disabling a Bluetooth page scan 118. The method 200 may be performed by a Bluetooth device 102. The Bluetooth device 102 may enable 202 Bluetooth communications. In other words, Bluetooth may be on. When Bluetooth communication is activated on the Bluetooth device 102, the Bluetooth device 102 may be in a connectable state. For example, a remote Bluetooth device 104 that has previously paired with the Bluetooth device 102 may connect with the Bluetooth device 102.

While in the connectable state, the Bluetooth device 102 may perform periodic page scans 118. In one implementation, the Bluetooth device 102 may perform a page scan 118 every 1.28 seconds.

The Bluetooth device 102 may determine 204 a paired device configuration 110 for Bluetooth communication. The paired device configuration 110 may be the state of the remote Bluetooth devices 104 that are paired with the Bluetooth device 102. In one case, the Bluetooth device 102 may determine whether there are no paired devices. In another case, the Bluetooth device 102 may determine whether all paired devices are connected. In yet another case, the Bluetooth device 102 may determine whether no paired device has attempted to connect to the Bluetooth device 102 within a threshold time period 112. In another case, the Bluetooth device 102 may determine a paired device connection history 114 for the current time of day.

The Bluetooth device 102 may disable 206 Bluetooth page scans 118 based on the paired device configuration 110. Various paired device configurations 110 may be used as conditions to disable 206 page scans 118. The page scan 118 may be conditionally enabled and disabled based on various use cases associated with the paired device configuration 110. Different scenarios for determining whether to disable 206 Bluetooth page scans 118 are discussed in connection with FIGS. 3-7 below.

Figure 3:
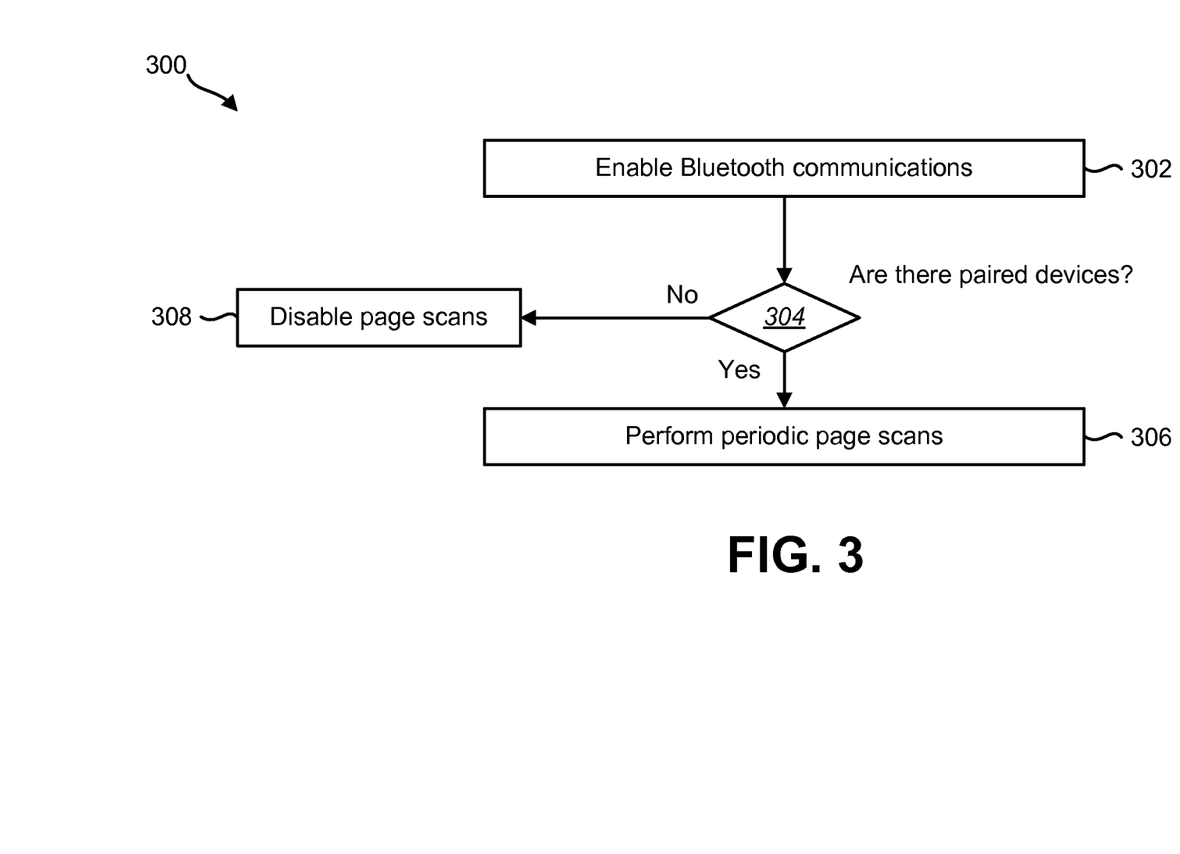
FIG. 3 is a flow diagram illustrating a method for disabling a Bluetooth page scan based on whether there are no paired devices.

FIG. 3 is a flow diagram illustrating a method 300 for disabling a Bluetooth page scan 118 based on whether there are no paired devices. The method 300 may be performed by a Bluetooth device 102. The Bluetooth device 102 may enable 302 Bluetooth communications. When Bluetooth communication is activated on the Bluetooth device 102, the Bluetooth device 102 may be in a connectable state.

The Bluetooth device 102 may determine 304 whether there are paired devices. For example, the Bluetooth device 102 may determine whether a paired device list 106 contains any paired device profiles 108. If there is one or more paired device profiles 108 in the paired device list 106, then the Bluetooth device 102 is paired with one or more remote Bluetooth devices 104. In this case, the Bluetooth device 102 may perform 306 periodic page scans 118. In one implementation, the Bluetooth device 102 may perform 306 a page scan 118 every 1.28 seconds.

The Bluetooth device 102 may determine 304 that there are no paired devices. This may be because no remote Bluetooth device 104 has paired with the Bluetooth device 102 and no paired device profile 108 has been added to the paired device list 106. Alternatively, all paired device profiles 108 may have been removed from the Bluetooth device 102. If there are no paired devices, the Bluetooth device 102 may disable 308 the page scans 118.

Figure 4:
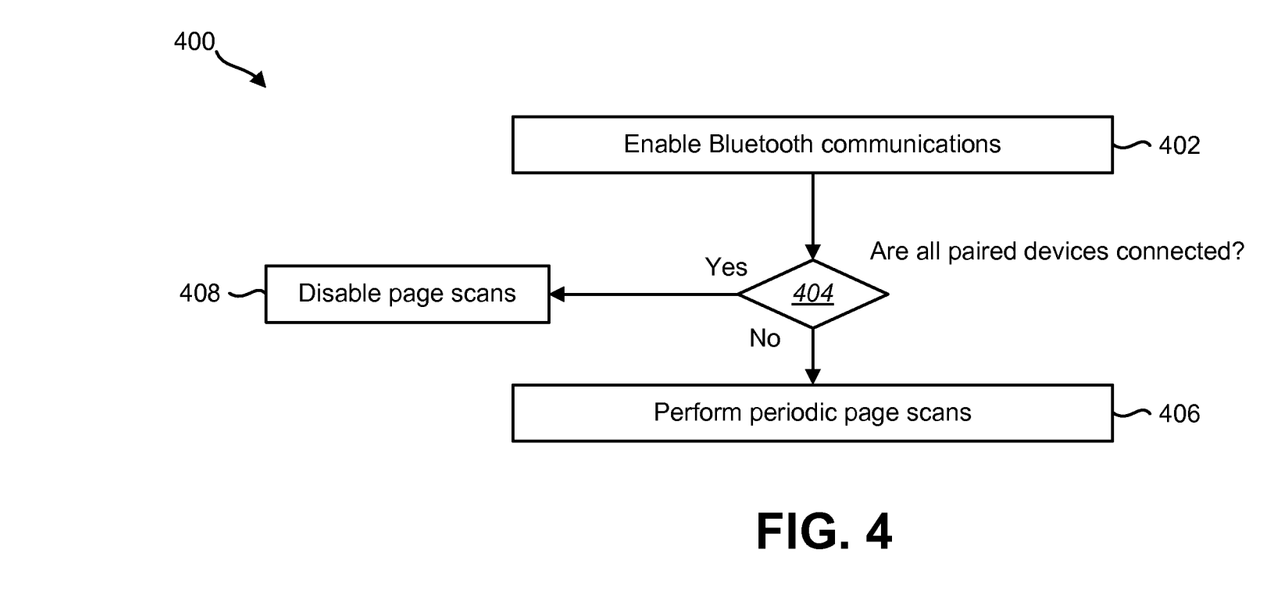
FIG. 4 is a flow diagram illustrating a method for disabling a Bluetooth page scan based on whether all paired devices are connected.

FIG. 4 is a flow diagram illustrating a method 400 for disabling a Bluetooth page scan 118 based on whether all paired devices are connected. The method 400 may be performed by a Bluetooth device 102. The Bluetooth device 102 may enable 402 Bluetooth communications. When Bluetooth communication is activated on the Bluetooth device 102, the Bluetooth device 102 may be in a connectable state.

The Bluetooth device 102 may determine 404 whether all paired devices are connected. For example, the Bluetooth device 102 may determine whether it is connected to each of the paired devices in a paired device list 106. If the Bluetooth device 102 is not connected to all of the paired devices, the Bluetooth device 102 may perform 406 periodic page scans 118. In one implementation, the Bluetooth device 102 may perform 406 a page scan 118 every 1.28 seconds.

If the Bluetooth device 102 determines 404 that all paired devices are connected to the Bluetooth device 102, then the Bluetooth device 102 may disable 408 page scans 118. In this case, when Bluetooth is on and all paired devices are connected, the Bluetooth page scan 118 may be unnecessary. As discussed above, if all paired devices are connected, the Bluetooth device 102 is not expecting any new connection. Therefore, the page scans 118 may be disabled.

Figure 5:
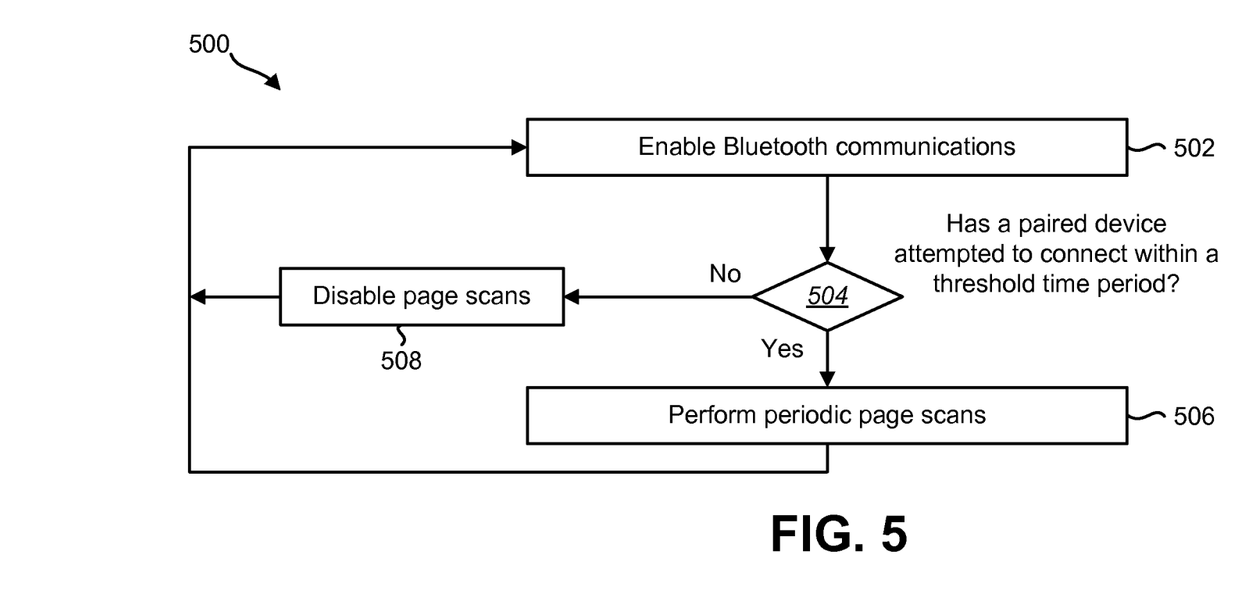
FIG. 5 is a flow diagram illustrating a method for disabling a Bluetooth page scan based on a threshold time period.

FIG. 5 is a flow diagram illustrating a method 500 for disabling a Bluetooth page scan 118 based on a threshold time period 112. The method 500 may be performed by a Bluetooth device 102. The Bluetooth device 102 may enable 502 Bluetooth communications. When Bluetooth communication is activated on the Bluetooth device 102, the Bluetooth device 102 may be in a connectable state.

The Bluetooth device 102 may determine 504 whether a paired device has attempted to connect within a threshold time period 112. The threshold time period 112 may be an amount of time the Bluetooth device 102 has not detected connection activity from one or more remote Bluetooth devices 104. The threshold time period 112 may be a configurable amount of time (e.g., hours, days). The threshold time period 112 may be selected to indicate a low likelihood of connection by the paired devices.

If the Bluetooth device 102 determines 504 that one or more paired devices has attempted to connect or is connected to the Bluetooth device 102, then this indicates a high likelihood of activity by the paired devices. Therefore, the Bluetooth device 102 may perform 506 periodic page scans 118. In one implementation, the Bluetooth device 102 may perform 506 a page scan 118 every 1.28 seconds. In this way, the Bluetooth device 102 may remain connectable for the paired devices.

If the Bluetooth device 102 determines 504 that no paired device has attempted to connect to the Bluetooth device 102 within the threshold time period 112, then this indicates activity by the paired devices is unlikely. The Bluetooth device 102 may disable 508 page scans 118. In this case, when Bluetooth is on but connections to paired devices are unlikely, the Bluetooth device 102 may disable 508 page scans 118 to conserve power despite still being paired with the remote Bluetooth devices 104.

Figure 6:
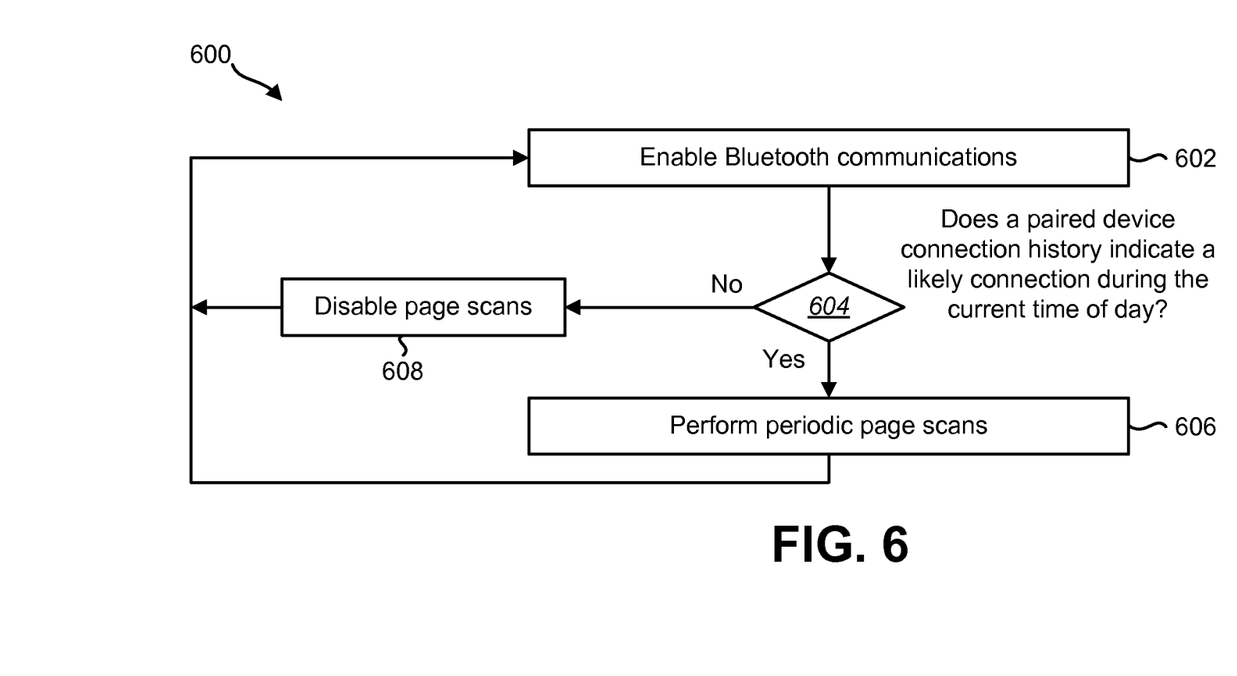
FIG. 6 is a flow diagram illustrating a method for disabling a Bluetooth page scan based on a paired device connection history.

FIG. 6 is a flow diagram illustrating a method 600 for disabling a Bluetooth page scan 118 based on a paired device connection history 114. The method 600 may be performed by a Bluetooth device 102. The Bluetooth device 102 may enable 602 Bluetooth communication. When Bluetooth communication is activated on the Bluetooth device 102, the Bluetooth device 102 may be in a connectable state.

The Bluetooth device 102 may determine 604 whether a paired device connection history 114 indicates connections during the current time of day. A user may use a set of remote Bluetooth devices 104 on regular basis according to some time pattern. The Bluetooth device 102 may store the paired device use patterns in the paired device connection history 114. In one implementation, the paired device connection history 114 may also include paired device location information 116 to further indicate the likelihood of a connection at the current time and location.

The Bluetooth device 102 may query the paired device connection history 114 to determine whether a connection to a paired device is likely at the current time of day. If the Bluetooth device 102 determines 604 that the paired device connection history 114 indicates that a connection is likely, then the Bluetooth device 102 may perform 606 periodic page scans 118. In this way, the Bluetooth device 102 may remain connectable for the paired devices.

If the Bluetooth device 102 determines 604 that the paired device connection history 114 does not indicate that a connection is likely during the current time of day, then the Bluetooth device 102 may disable 608 page scans 118. In this case, when Bluetooth is on but connections to paired devices are unlikely, the Bluetooth device 102 may disable 608 page scans 118 to conserve power despite still being paired with the remote Bluetooth devices 104.

At a later time, the Bluetooth device 102 may re-evaluate whether to enable or disable page scans 118. For example, the Bluetooth device 102 may determine 604 whether the paired device connection history 114 indicates a likely connection at the later time. The Bluetooth device 102 may then perform or disable page scans 118 accordingly.

Figure 7:
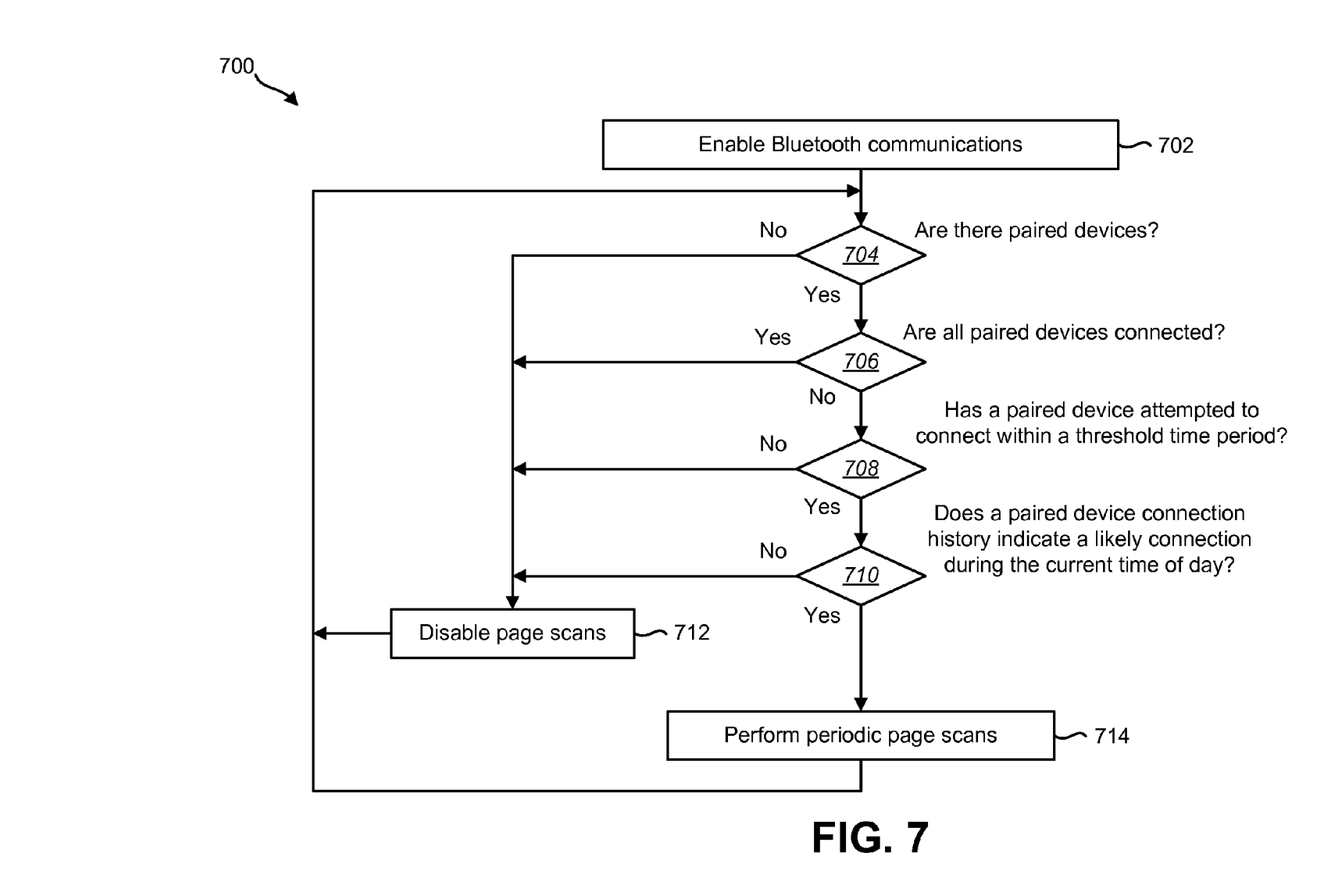
FIG. 7 is a flow diagram illustrating a method for disabling a Bluetooth page scan based on one or more paired device configurations.

FIG. 7 is a flow diagram illustrating a method 700 for disabling a Bluetooth page scan 118 based on one or more paired device configurations 110. The method 700 may be performed by a Bluetooth device 102. The Bluetooth device 102 may enable 702 Bluetooth communications. When Bluetooth communication is activated on the Bluetooth device 102, the Bluetooth device 102 may be in a connectable state.

The Bluetooth device 102 may determine 704 whether there are paired devices. For example, the Bluetooth device 102 may determine whether a paired device list 106 contains any paired device profiles 108. If there are no paired device profiles 108 in the paired device list 106, then the Bluetooth device 102 is not paired with a remote Bluetooth device 104. If there are no paired devices, then the Bluetooth device 102 may disable 712 page scans 118.

If the Bluetooth device 102 determines 704 that there are paired devices, then the Bluetooth device 102 may determine 706 whether all paired devices are connected. For example, the Bluetooth device 102 may determine whether it is connected to each of the paired devices in the paired device list 106. If the Bluetooth device 102 is connected to all paired devices, then the Bluetooth device 102 may disable 712 page scans 118.

If the Bluetooth device 102 determines 706 that not all paired devices are connected, then the Bluetooth device 102 may determine 708 whether a paired device has attempted to connect within a threshold time period 112. The threshold time period 112 may be an amount of time the Bluetooth device 102 has not detected connection activity from one or more remote Bluetooth devices 104. If no paired device has attempted to connect to the Bluetooth device 102 within the threshold time period 112, then the Bluetooth device 102 may disable 712 page scans 118.

If the Bluetooth device 102 determines 708 that a paired device has attempted to connect within a threshold time period 112, then the Bluetooth device 102 may determine 710 whether a paired device connection history 114 indicates a likely connection during the current time of day. If the paired device connection history 114 does not indicate that a connection to a paired device is likely at the current time, then the Bluetooth device 102 may disable 712 page scans 118.

If the Bluetooth device 102 determines 710 that a paired device connection history 114 indicates a likely connection during the current time of day, then the Bluetooth device 102 may perform 714 periodic page scans 118. In one implementation, the Bluetooth device 102 may perform 714 a page scan 118 every 1.28 seconds.

Upon disabling 712 or performing 714 the page scans 118, the Bluetooth device 102 may re-evaluate whether to enable or disable page scans 118. For example, the Bluetooth device 102 may repeat the method 700 to determine whether the paired device configurations 110 have changed. The Bluetooth device 102 may then disable 712 or perform 714 page scans 118 accordingly.

Figure 8:
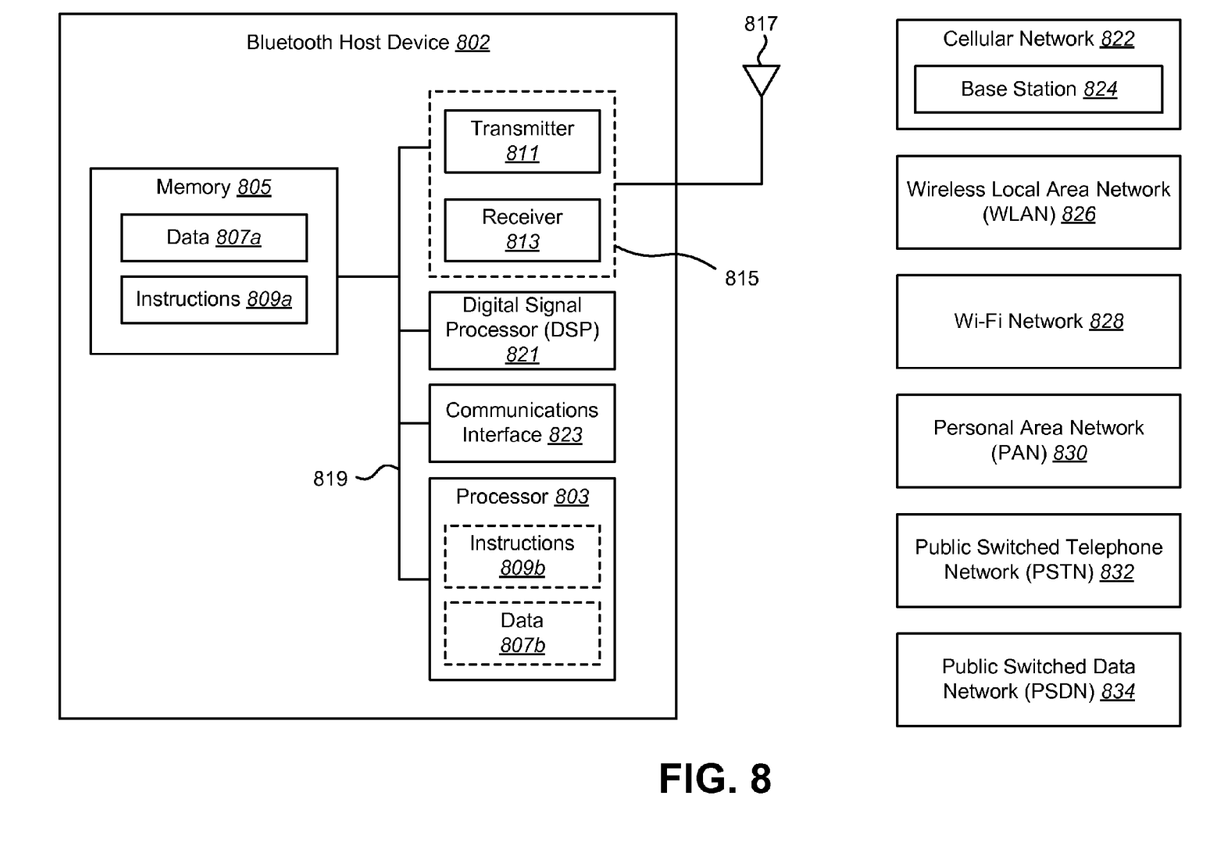
FIG. 8 illustrates certain components that may be included within a Bluetooth device.

FIG. 8 illustrates certain components that may be included within a Bluetooth device 802. The Bluetooth device 802 may be a wireless device, an access terminal, a mobile station, a user equipment (UE), a laptop computer, a desktop computer, a wireless headset, etc. For example, the Bluetooth device 802 may be a Bluetooth device 102 of FIG. 1.

The Bluetooth device 802 includes a processor 803. The processor 803 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 803 may be referred to as a central processing unit (CPU). Although just a single processor 803 is shown in the Bluetooth device 802 of FIG. 8, in an alternative configuration, a combination of processors (e.g., an ARM and DSP) could be used.

The Bluetooth device 802 also includes memory 805 in electronic communication with the processor 803 (i.e., the processor can read information from and/or write information to the memory). The memory 805 may be any electronic component capable of storing electronic information. The memory 805 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 807a and instructions 809a may be stored in the memory 805. The instructions 809a may include one or more programs, routines, sub-routines, functions, procedures, code, etc. The instructions 809a may include a single computer-readable statement or many computer-readable statements. The instructions 809a may be executable by the processor 803 to implement the methods disclosed herein. Executing the instructions 809a may involve the use of the data 807a that is stored in the memory 805. When the processor 803 executes the instructions 809, various portions of the instructions 809b may be loaded onto the processor 803, and various pieces of data 807b may be loaded onto the processor 803.

The Bluetooth device 802 may also include a transmitter 811 and a receiver 813 to allow transmission and reception of signals to and from the Bluetooth device 802 via an antenna 817. The transmitter 811 and receiver 813 may be collectively referred to as a transceiver 815. The Bluetooth device 802 may also include (not shown) multiple transmitters, multiple antennas, multiple receivers and/or multiple transceivers.

The Bluetooth device 802 may include a digital signal processor (DSP) 821. The Bluetooth device 802 may also include a communications interface 823. The communications interface 823 may allow a user to interact with the Bluetooth device 802.

The various components of the Bluetooth device 802 may be coupled together by one or more buses, which may include a power bus, a control signal bus, a status signal bus, a data bus, etc. For the sake of clarity, the various buses are illustrated in FIG. 8 as a bus system 819.

The Bluetooth device 802 may be configured to communicate with one or more communication networks. In one implementation, the Bluetooth device 802 may communicate with one or more cellular networks 822. For example, the Bluetooth device 802 may send and receive wireless signals from a base station 824 of a cellular network 822. Examples of cellular networks include Long Term Evolution (LTE) networks, Global System for Mobile Communications (GSM) networks, code division multiple access (CDMA) networks, CDMA2000 networks, wideband CDMA (W-CDMA) networks, Universal mobile Telecommunications System (UMTS) networks, Worldwide Interoperability for Microwave Access (WiMAX) networks, etc.

In another implementation, the Bluetooth device 802 may communicate with one or more wireless local area network (WLAN) 826. The Bluetooth device 802 may communicate with an access point (AP) in a WLAN 826 using radio signals or infrared signals. In one configuration, a WLAN may operate according to IEEE 802.11 standards. A specific example of a WLAN using IEEE 802.11 standards includes a Wi-Fi network 828.

In yet another implementation, the Bluetooth device 802 may communicate with a personal area network (PAN) 830. Examples of a PAN 830 include Bluetooth, ZigBee, near-field communication (NFC) and wireless USB.

Other communication networks with which the Bluetooth device 802 may communicate include a public switched telephone network (PSTN) 832 and a public switched data network (PSDN) 834. In one implementation, the Bluetooth device 802 may connect to a PSTN 832 or PSDN 834 via a cellular network 822.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as illustrated by FIGS. 2-7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for wireless communication by a Bluetooth device, comprising:
   determining a paired device configuration for Bluetooth communication, wherein determining the paired device configuration comprises determining a paired device connection history, wherein Bluetooth page scans are disabled at a specific time of day based on the paired device connection history for that time of day; and
   disabling Bluetooth page scans based on the paired device configuration when the Bluetooth device is in a connectable state for Bluetooth communication.

2. The method of claim 1, wherein Bluetooth page scans are further disabled when Bluetooth communication is on and the Bluetooth device has no paired devices.

3. The method of claim 2, wherein Bluetooth page scans are further disabled when a paired device list does not contain any paired device profiles.

4. The method of claim 2, wherein Bluetooth page scans are further disabled when all paired device profiles have been removed from the Bluetooth device.

5. The method of claim 1, wherein Bluetooth page scans are further disabled when the paired device configuration comprises Bluetooth communication is on and no paired device has attempted to connect to the Bluetooth device within a threshold time period.

6. The method of claim 1, wherein Bluetooth page scans are further disabled when the paired device configuration comprises all paired devices are connected to the Bluetooth device.

7. The method of claim 6, further comprising applying resources made available by disabling the page scans to improve a quality of service of existing connections to the paired devices.

8. A Bluetooth device, comprising:
   a processor;
   memory in electronic communication with the processor; and
   instructions stored in the memory, the instructions being executable by the processor to:
     determine a paired device configuration for Bluetooth communication, wherein the instructions executable to determine the paired device configuration comprise instructions executable to determine a paired device connection history, wherein Bluetooth page scans are disabled at a specific time of day based on the paired device connection history for that time of day; and disable Bluetooth page scans based on the paired device configuration when the Bluetooth device is in a connectable state for Bluetooth communication.

9. The Bluetooth device of claim 8, wherein Bluetooth page scans are further disabled when Bluetooth communication is on and the Bluetooth device has no paired devices.

10. The Bluetooth device of claim 9, wherein Bluetooth page scans are further disabled when a paired device list does not contain any paired device profiles.

11. The Bluetooth device of claim 9, wherein Bluetooth page scans are further disabled when all paired device profiles have been removed from the Bluetooth device.

12. The Bluetooth device of claim 8, wherein Bluetooth page scans are further disabled when the paired device configuration comprises Bluetooth communication is on and no paired device has attempted to connect to the Bluetooth device within a threshold time period.

13. The Bluetooth device of claim 8, wherein Bluetooth page scans are further disabled when the paired device configuration comprises all paired devices are connected to the Bluetooth device.

14. The Bluetooth device of claim 13, further comprising instructions executable to apply resources made available by disabling the page scans to improve a quality of service of existing connections to the paired devices.

15. An apparatus for wireless communication, comprising:

means for determining a paired device configuration for Bluetooth communication, wherein the means for determining the paired device configuration comprises means for determining a paired device connection history, wherein Bluetooth page scans are disabled at a specific time of day based on the paired device connection history for that time of day; and means for disabling Bluetooth page scans based on the paired device configuration when the apparatus is in a connectable state for Bluetooth communication.

16. The apparatus of claim 15, wherein Bluetooth page scans are further disabled when Bluetooth communication is on and the apparatus has no paired devices.

17. The apparatus of claim 16, wherein Bluetooth page scans are further disabled when a paired device list does not contain any paired device profiles.

18. The apparatus of claim 16, wherein Bluetooth page scans are further disabled when all paired device profiles have been removed from the apparatus.

19. The apparatus of claim 15, wherein Bluetooth page scans are further disabled when the paired device configuration comprises Bluetooth communication is on and no paired device has attempted to connect to the apparatus within a threshold time period.

20. The apparatus of claim 15, wherein Bluetooth page scans are further disabled when the paired device configuration comprises all paired devices are connected to the apparatus.

21. A computer-program product for wireless communication, the computer-program product comprising a non-transitory computer-readable medium having instructions thereon, the instructions comprising:

code for causing a Bluetooth device to determine a paired device configuration for Bluetooth communication, wherein the code for causing the Bluetooth device to determine the paired device configuration comprises code for causing the Bluetooth device to determine a paired device connection history, wherein Bluetooth page scans are disabled at a specific time of day based on the paired device connection history for that time of day; and code for causing the Bluetooth device to disable Bluetooth page scans based on the paired device configuration when the Bluetooth device is in a connectable state for Bluetooth communication.

22. The computer-program product of claim 21, wherein Bluetooth page scans are further disabled when Bluetooth communication is on and the Bluetooth device has no paired devices.

23. The computer-program product of claim 22, wherein Bluetooth page scans are further disabled when a paired device list does not contain any paired device profiles.

24. The computer-program product of claim 22, wherein Bluetooth page scans are further disabled when all paired device profiles have been removed from the Bluetooth device.

25. The computer-program product of claim 21, wherein Bluetooth page scans are further disabled when the paired device configuration comprises Bluetooth communication is on and no paired device has attempted to connect to the Bluetooth device within a threshold time period.

26. The computer-program product of claim 21, wherein Bluetooth page scans are further disabled when the paired device configuration comprises all paired devices are connected to the Bluetooth device.

* * * * *